(12) United States Patent
Xi et al.

(10) Patent No.: US 10,909,699 B2
(45) Date of Patent: Feb. 2, 2021

(54) METHOD AND DEVICE FOR IMAGE PROCESSING

(71) Applicant: ARCSOFT CORPORATION LIMITED, Hangzhou (CN)

(72) Inventors: Wenxing Xi, Hangzhou (CN); Hui Deng, Hangzhou (CN); Hongzhuang Yang, Hangzhou (CN); Naiyang Lin, Hangzhou (CN); Long Zhang, Hangzhou (CN)

(73) Assignee: ARCSOFT CORPORATION LIMITED, Hangzhou (CN)

( * ) Notice: Subject to any disclaimer, the term of this patent is extended or adjusted under 35 U.S.C. 154(b) by 93 days.

(21) Appl. No.: 16/167,486

(22) Filed: Oct. 22, 2018

(65) Prior Publication Data

US 2019/0122376 A1 Apr. 25, 2019

(30) Foreign Application Priority Data

Oct. 20, 2017 (CN) .......................... 2017 1 0986057

(51) Int. Cl.
| | |
|---|---|
| *G06F 9/46* | (2006.01) |
| *G06T 7/37* | (2017.01) |
| *G06T 7/564* | (2017.01) |
| *G06T 5/50* | (2006.01) |
| *G06T 19/20* | (2011.01) |
| *G06T 17/20* | (2006.01) |
| *G06T 11/60* | (2006.01) |
| *G06K 9/00* | (2006.01) |

(52) U.S. Cl.
CPC ............ *G06T 7/37* (2017.01); *G06K 9/00221* (2013.01); *G06T 5/50* (2013.01); *G06T 7/564* (2017.01); *G06T 11/60* (2013.01); *G06T 17/20* (2013.01); *G06T 19/20* (2013.01); *G06T 2207/10028* (2013.01); *G06T 2207/20221* (2013.01); *G06T 2207/30201* (2013.01); *G06T 2219/2016* (2013.01)

(58) Field of Classification Search
CPC . G06T 19/20; G06T 2219/2021; G06T 13/40; G06T 17/00; G06T 2219/2004; G06T 15/00; G06T 19/006; G06T 15/02; G06T 2207/30201; G06T 11/60; G06T 2210/16; G06T 7/70; G06T 11/00; G06T 11/001; G06T 11/206; G06T 15/10; G06T 15/20; G06T 15/50; G06T 19/00; G06T 2207/10004
See application file for complete search history.

(56) References Cited

U.S. PATENT DOCUMENTS

| | | | |
|---|---|---|---|
| 2007/0216675 A1* | 9/2007 | Sun .................... | G06T 11/00 345/419 |
| 2009/0132371 A1* | 5/2009 | Strietzel ............. | G06T 19/20 705/14.46 |

* cited by examiner

*Primary Examiner* — Quan M Hua
(74) *Attorney, Agent, or Firm* — Bayramoglu Law Offices LLC

(57) ABSTRACT

The present invention provides a method and a device for image processing, which are applied to the field of image processing. The method includes: receiving a first image, wherein the first image includes a face; detecting the face and a background region in the first image, establishing a three-dimensional model of the face according to the first image; rotating the three-dimensional model of the face by a first angle; projecting the three-dimensional model of the face rotated by the first angle to an image coordinate system of the first image, and fusing a face region with a processed background region to obtain a second image. The prevent invention provides a method and device for image processing, which can adjust the angle of a face in a captured image to achieve the effect of face enhancement.

18 Claims, 7 Drawing Sheets

METHOD AND DEVICE FOR IMAGE PROCESSING

CROSS REFERENCE TO RELATED APPLICATIONS

This application is based upon and claims priority to Chinese Patent Application No. 201710986057.7, filed on Oct. 20, 2017, the entire contents of which are incorporated herein by reference.

TECHNICAL FIELD

The present invention relates to a method and a device for pattern recognition and, more particularly, to a method and a device for image processing.

BACKGROUND

At present, portrait editing is a widely used technique which includes face texture editing such as removal of spots, wrinkles, and pimples on a human face on a photo, skin whitening, smoothing, ambient light adjusting, and the like. The portrait editing further includes face shape editing such as slimming the face, enlarging the eyes, and the like.

There is no technique in the prior art for adjusting the face angle in a captured image.

SUMMARY

The present invention provides a method and a device for image processing to solve the problem that the prior art lacks a technique for adjusting the angle of a face in a capture image.

In a first aspect, the present invention provides a method for image processing, and the method includes: receiving a first image, wherein the first image includes a face; detecting the face and a background region in the first image; establishing a three-dimensional model of the face according to the first image; rotating the three-dimensional model of the face by a first angle; projecting the three-dimensional model of the face rotated by the first angle to an image coordinate system of the first image and fusing a face region with a processed background region to obtain a second image.

According to the first aspect of the present invention, for a first executable mode of the first aspect of the present invention, processing the background region includes: acquiring depth information corresponding to the background region, and acquiring a three-dimensional model of the background region according to the depth information corresponding to the background region; rotating the three-dimensional model of the background region by the first angle; projecting the three-dimensional model of the background region rotated by the first angle to the image coordinate system of the first image to obtain the processed background region of the first image.

According to the first aspect of the present invention or the first executable mode of the first aspect of the present invention, for a second executable mode of the first aspect of the present invention, the first image includes a first two-dimensional image and a depth image corresponding to the first two-dimensional image, and the first two-dimensional image and the depth image include the face, establishing the three-dimensional model of the face according to the first image which includes: fitting the three-dimensional model of the face according to positions of feature points of the face in the first two-dimensional image and the depth image corresponding to the first two-dimensional image by using a second three-dimensional face database.

According to the second executable mode of the first aspect of the present invention, for a third executable mode of the first aspect of the present invention; the second three-dimensional face database includes average face models, shape feature vectors and expression feature vectors, fitting the three-dimensional model of the face according to the positions of the feature points of the face in the first two-dimensional image and the depth image corresponding to the first two-dimensional image by using the second three-dimensional face database includes: estimating an initial transformation matrix from the average face model to a three-dimensional point cloud model corresponding to the depth image, according to the initial transformation matrix, the shape feature vectors and the expression feature vectors, fitting the three-dimensional model of the face based on the average face models with at least one of the following conditions as a target: distances between projection positions of the feature points of the three-dimensional model of the face obtained by fitting in the image coordinate system and positions of feature points of the two-dimensional image included in the first image are minimal or convergent. A distance between a corresponding point pair of the three-dimensional model of the face obtained by fitting and the three-dimensional point cloud obtained by mapping of the depth image also is minimal or convergent.

According to the first aspect of the present invention or any one of the first executable mode of the first aspect of the present invention to the third executable mode of the first aspect of the present invention, for a fourth executable mode of the first aspect of the present invention, the method further includes: acquiring outer contour points of the face; dividing the background region into a background region connected to the face and a far background region according to distances between the outer contour points and a center of the face; wherein a distance between the far background region and the center of the face is greater than the distance between the background region connected to the face and the center of the face.

According to the fourth executable mode of the first aspect of the present invention, for a fifth executable mode of the first aspect of the present invention, acquiring the depth information corresponding to the background region includes: acquiring the depth information of the background region connected to the face and the far background region according to the depth image. The method further includes: acquiring depth information of the nose on the face according to the three-dimensional model of the face. Acquiring the depth information corresponding to the background region includes: estimating a depth value of a point in the background region connected to the face and a depth value of the far background region according to a depth value of the nose on the face and a difference between depth information of the outer contour points and the depth value of the nose on the face.

According to the fourth or fifth executable mode of the first aspect of the present invention, for a sixth executable mode of the first aspect of the present invention, the background region includes a mesh, and the method further includes: optimizing a depth value of the background region, wherein the optimization includes: keeping depth values of the outer contour point of the face unchanged and keeping variations of depth values of adjacent mesh points consistent.

According to the first aspect of the present invention or any one of the first executable mode of the first aspect of the present invention to the sixth executable mode of the first aspect of the present invention, for a seventh executable mode of the first aspect of the present invention, fusing the face region with the processed background region includes at least one of the following conditions: an image boundary of the first image is consistent with an image boundary of the processed background region; outer contour points of the face of the first image are consistent with the outer contour points of a face of a projection of the three-dimensional model of the face in the image coordinate system of the first image after the three-dimensional model of the face is rotated by the first angle.

According to any one of the first executable mode(s) of the first aspect of the present invention to the seventh executable mode of the first aspect of the present invention, for an eighth executable mode of the first aspect of the present invention, the background region of the first image includes a first mesh the method further includes: acquiring a position of a second mesh corresponding to the first mesh of the background region of the first image, wherein the position of the second mesh is in a region of the projection of the three-dimensional model of the background region rotated by the first angle in the image coordinate system of the first image. The second mesh is filled according to textures and/or colors of the first mesh.

In a second aspect, the present invention provides a method for image processing, and the method includes: receiving a third two-dimensional image and a depth image corresponding to a third two-dimensional image, wherein the third two-dimensional image and the depth image include a face; establishing a three-dimensional model of the face according to the depth image; rotating the three-dimensional model of the face by a first angle; projecting the three-dimensional model of the face rotated by the first angle to an image coordinate system of the third two-dimensional image; building a three-dimensional model of a background region of the third two-dimensional image, processing a background region of an image projected to the image coordinate system of the third two-dimensional image to obtain a fourth image.

In a third aspect, the present invention provides a device for image processing, and the device includes: a receiver, configured to receive a first image, wherein the first image includes a face; a detection and model establishment processor, configured to detect a face and a background region of the first image and establish a three-dimensional model of the face according to the first image; a rotation processor, configured to rotate the three-dimensional model of the face by a first angle; a fusion processor, configured to project the three-dimensional model of the face rotated by the first angle to an image coordinate system of the first image, and fuse a face region with a processed background region to obtain a second image.

According to the third aspect of the present invention, for a first executable mode of the third aspect of the present invention, the device further includes a background processor, the background processor is configured to acquire depth information corresponding to the background region, to acquire a three-dimensional model of the background region according to the depth information corresponding to the background region, to rotate the three-dimensional model of the background region by the first angle, and to project the three-dimensional model of the background region rotated by the first angle to the image coordinate system of the first image, thereby obtaining the processed background region of the first image.

According to the third aspect of the present invention or the first executable mode of the third aspect of the present invention, for a second executable mode of the third aspect of the present invention, the first image includes a first two-dimensional image and a depth image corresponding to the first two-dimensional image, wherein the first two-dimensional image and the depth image includes the face; the detection and model establishment processor is specifically configured to fit the three-dimensional model of the face according to positions of feature points of the face in the first two-dimensional image and the depth image corresponding to the first two-dimensional image by using a second three-dimensional face database.

According to the second executable mode of the third aspect of the present invention, for a third executable mode of the third aspect of the present invention, the second three-dimensional face database includes average face models, shape feature vectors and expression feature vectors. The detection and model establishment processor is specifically configured to estimate an initial transformation matrix from the average face model to a three-dimensional point cloud model corresponding to the depth image, and fit the three-dimensional model of the face based on the average face model according to the initial transformation matrix, the shape feature vectors and the expression feature vectors with at least one of the following conditions as a target: the distances between projection positions of the feature points of the three-dimensional model of the face obtained by fitting in the image coordinate system and positions of feature points of the two-dimensional image included in the first image are minimal; distance between a corresponding point pair of the three-dimensional model of the face obtained by fitting and the three-dimensional point cloud obtained by mapping of the depth image is minimal.

According to the third aspect of the present invention or any one of the first executable mode of the third aspect of the present invention to the third executable mode of the third aspect of the present invention, for a fourth executable mode of the third aspect of the present invention, the device further includes an acquisition and background division processor, and the acquisition and background division processor is configured to acquire outer contour points of the face, and divide the background region into a background region connected to the face and a far background region according to distances between the outer contour points and a center of the face, wherein a distance between the far background region and the center of the face is greater than a distance between the background region connected to the face and the center of the face.

According to the fourth executable mode of the third aspect of the present invention, for a fifth executable mode of the third aspect of the present invention, the background processor is configured to acquire depth information of the background region connected to the face and the background region away from the face according to the depth image. The device further includes a nose depth information acquisition processor, and the nose depth information acquisition processor is configured to acquire depth information of a nose on the face according to the three-dimensional model of the face. The background processor is configured to estimate depth value of a point in the background region connected to the face and a depth value of the far background region according to a depth value of the nose on the face and a difference between depth information of the outer contour point and the depth value of the nose on the face.

According to the fourth or fifth executable mode of the third aspect of the present invention, for a sixth executable mode of the third aspect of the present invention, the background region includes a mesh. The device further includes an optimization processor, and the optimization processor is configured to keep depth value of the outer contour points of the face unchanged and keep variations of depth values of adjacent mesh points consistent According to the third aspect of the present invention or any one of the first executable mode(s) of the third aspect of the present invention to the sixth executable mode of the third aspect of the present invention, for a seventh executable mode of the third aspect of the present invention, the fusion processor is specifically configured to make an image boundary of the first image consistent with a boundary of an image of the processed background region, and make outer contour points of the face of the first image consistent with outer contour points of a face of a projection of the three-dimensional model of the face in the image coordinate system of the first image after the three-dimensional model of the face is rotated by the first angle.

According to any one of the first executable mode of the third aspect of the present invention to the seventh executable mode of the third aspect of the present invention, for an eighth executable mode of the third aspect of the present invention, the background region of the first image includes a first mesh. The device further includes a filling processor, and the filling processor is configured to acquire a position of a second mesh corresponding to the first mesh of the background region of the first image, wherein the position of the second mesh is in a region of a projection of the three-dimensional model of the background region rotated by the first angle in the image coordinate system of the first image. The second mesh is filled according to textures and/or colors of the first mesh.

In a fourth aspect, the invention provides a device for implementing the method for image processing, which includes: a receiver, configured to receive the third two-dimensional image and the depth image corresponding to the third two-dimensional image, wherein the third two-dimensional image and the depth image include the face; a model establishment processor; configured to establish the three-dimensional model according to the depth image; a rotation processor, configured to rotate the three-dimensional model by the first angle; a projection processor, configured to project the three-dimensional model rotated by the first angle to the image coordinate system of the third two-dimensional image; and a background processor, configured to build a three-dimensional model of a background region of the third two-dimensional image and process a background region of the image projected to the image coordinate system of the third two-dimensional image according to a background region of the third two-dimensional image, to obtain a fourth image.

A fifth aspect of the present invention provides a computer readable storage medium, and the computer readable storage medium stores computer programs. When the computer programs are executed by a first processor, steps of the method described in the first aspect of the present invention, any one of the first executable mode of the first aspect of the present invention to the eighth executable mode of the first aspect of the present invention, the second aspect of the present invention, or any one of the first executable mode of the second aspect of the present invention to the second executable mode of the second aspect of the present invention, are implemented.

In a sixth aspect, the present invention provides a device for image processing, which includes a memory, a second processor, and computer programs stored in the memory and operable on the second processor. When the computer programs are executed by the processor, the steps of the method described in the first aspect of the present invention, any one of the first executable mode of the first aspect of the present invention to the eighth executable mode of the first aspect of the present invention, the second aspect of the present invention; or any one of the first executable mode of the second aspect of the present invention to the second executable mode of the second aspect of the present invention, are implemented.

The prevent invention provides a method and a device for image processing, which can adjust the angle of a face in a captured image to achieve the effect of face enhancements.

DETAILED DESCRIPTION OF THE EMBODIMENTS

Figure 1:
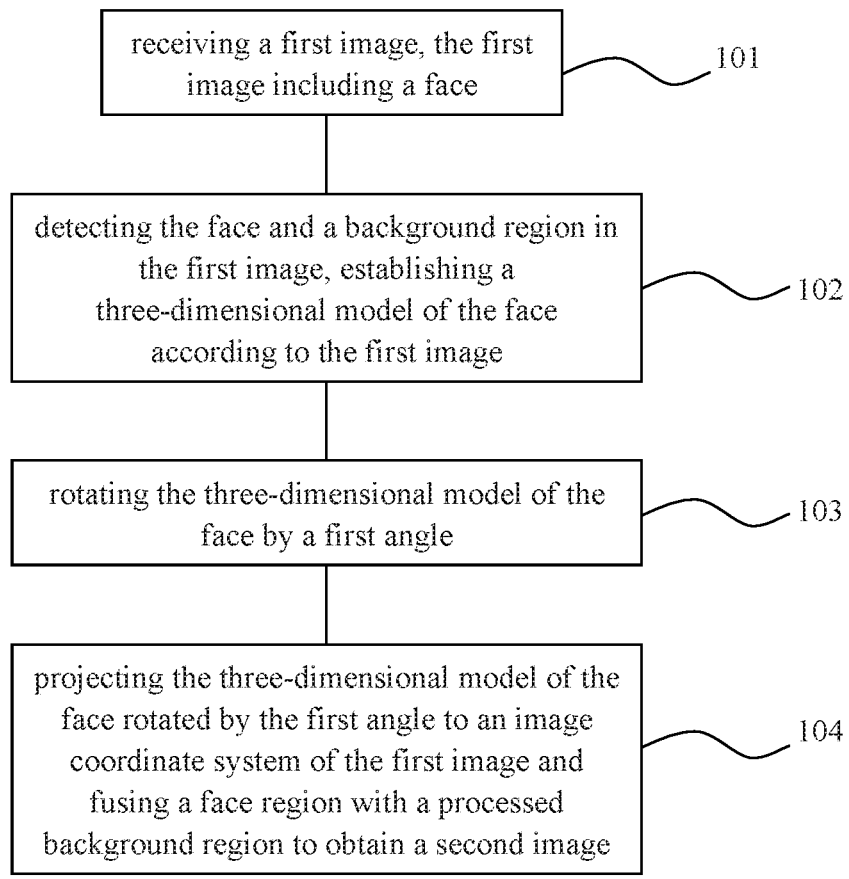
FIG. 1 is a flowchart showing a method for image processing according to embodiment 1 of the present invention.

The technical solutions of the embodiments of the present invention are described in detail hereinafter with reference to the drawings of the embodiments of the present invention.

The terms "first", "second", and the like, in the specification, claims, and drawings of the present invention are used to distinguish different objects rather than limit a specific order.

The term "and/or" in the embodiments of the present invention is merely used to describe an association relationship of associated objects, and it can indicate three cases. For example, A and/or B can be interpreted as three cases, i.e. only A, both A and B, or only B.

In the embodiments of the present invention, the words such as "exemplary" or "for example" etc. are used to indicate that examples, exemplifications, or illustrations are described. Any embodiment or designed solution described as "exemplary" or "for example" in the embodiments of the present invention should not be construed as more preferred or advantageous over other embodiments or designed solutions. Rather, the use of the words "exemplary" or "for example" are intended to describe relevant concepts in a specific manner.

It should be noted that; for the sake of brevity and clarity of the drawings, the elements shown in the drawings are not necessarily drawn to scale. For example, the sizes of some elements can be increased relative to other elements for clarity. Further, where considered appropriate, reference numerals can be repeated in the drawings to indicate corresponding or similar elements.

A method for image processing according to embodiment 1 of the present invention is described in detail below with reference to FIG. 1. As shown in FIG. 1, the method includes the following steps.

Step 101: receiving a first image, wherein the first image includes a face.

Optionally, the first image includes a first two-dimensional image, and the first two-dimensional image may be a two-dimensional color image, such as an RGB (Red, Green, Blue) image.

Optionally, receiving a first image described above may include acquiring the first image from a storage device. The storage device may be a ROM (Read-Only Memory), a RAM (Random Access Memory), or a flash.

Step 102: detecting the face and a background region in the first image, and establishing a three-dimensional model of the face according to the first image.

Optionally, the three-dimensional model may be a three-dimensional point cloud in a world coordinate system. Optionally, the background region may be a non-face region.

Step 103: rotating the three-dimensional model of the face by a first angle.

Optionally, the first angle may be preset.

Step 104: projecting the three-dimensional model of the face rotated by the first angle to an image coordinate system of the first image, and fusing a face region with a processed background region to obtain a second image.

Processing the background region includes: acquiring depth information corresponding to the background region, and acquiring the three-dimensional model of the background region according to the depth information corresponding to the background region; rotating the three-dimensional model of the background region by the first angle; projecting the three-dimensional model of the background region rotated by the first angle to the image coordinate system of the first image to obtain the processed background region of the first image. Optionally, the order for performing the step of rotating the three-dimensional model of the background region by the first angle and the step of rotating the three-dimensional model of the face by the first angle may be unlimited. The steps can be performed successively, namely, either the three-dimensional model of the face or the three-dimensional model of the background region may be rotated first. Or, the steps can be performed in parallel, namely, the three-dimensional model of the face and the three-dimensional model of the background region are rotated, simultaneously. Processing the background region may further include filling the background region projected to the image coordinate system of the first image according to textures and/or colors of the first image.

Optionally, processing the background region may also include: comparing the two-dimensional image obtained by projecting the three-dimensional model of the face obtained in step 104 with the two-dimensional image obtained by projecting the three-dimensional model of the background region, without performing the step of projecting the rotated three-dimensional model of the background region, to obtain unsmooth transitional regions such as overlap and/or blank areas, and the like. The above-mentioned unsmooth transitional regions are processed by using the texture and/or color of the background, and the shape and texture of the two-dimensional image obtained by projecting the three-dimensional model of the face are unchanged during the processing. The order for performing the above-mentioned step of processing and the step of rotating the three-dimensional model of the face and projecting the three-dimensional model of the face is unlimited. The steps may be performed successively or in parallel.

Optionally, the first image includes a first two-dimensional image. Establishing the three-dimensional model of the face according to the first image, includes: detecting feature points of the face in the first two-dimensional image, and fitting the three-dimensional model of the face according to the feature points and a given fitting target by using a first three-dimensional face model database; or, the first two-dimensional image is iteratively calculated based on a deep convolutional neural network to obtain three-dimensional reconstruction parameters, and the three-dimensional model of the face is established according to the three-dimensional reconstruction parameters. The fitting target is to make distances between projections of three-dimensional feature points of the three-dimensional model of the face obtained by fitting in the image coordinate system of the first image and the feature points of the face in the first two-dimensional image minimal, convergent, or as small as possible. Optionally, there may be 68 feature points of the face which includes face contour, mouth, nose, eyes, eyebrows, and the like. Optionally, the first three-dimensional face model database may be a Morphable Face Model database, and based on this, the lighting, texture, and shape detail may be further fitted therewith.

Optionally, the first image includes a first two-dimensional image and a depth image corresponding to the first two-dimensional image. The first two-dimensional image and the depth image includes the face. Establishing the three-dimensional model of the face according to the first image, includes: fitting the three-dimensional model of the face according to positions of the feature points of the face in the first two-dimensional image and the depth image corresponding to the first two-dimensional image by using a second three-dimensional face database.

The second three-dimensional face database includes average face models and the following: shape feature vectors and expression feature vectors. Fitting the three-dimensional model of the face according to positions of the feature points of the face in the first two-dimensional image and the depth image corresponding to the first two-dimensional image by using a second three-dimensional face database, which includes: estimating an initial transformation matrix from the average face model to a three-dimensional point cloud model corresponding to the depth image, and according to the initial transformation matrix and the following shape feature vectors and expression feature vectors, fitting the three-dimensional model of the face based on the average face model with at least one of the following conditions as a target: the distance(s) between projection positions of the feature points of the three-dimensional model of the face obtained by fitting in the image coordinate system and positions of feature points of the two-dimensional image included in the corresponding first image are minimal, convergent, or as small as possible; the distance between a corresponding point pair of the three-dimensional model of the face obtained by fitting and the three-dimensional point cloud obtained by mapping of the depth image is minimal, convergent, or as small as possible. Optionally, the second three-dimensional face database can be stored in the device beforehand, such as mobile phone, tablet PC, and the like.

Estimating the initial transformation matrix from the average face model to the three-dimensional point cloud model corresponding to the depth image, includes: calculating three-dimensional positions of the feature points of the face according to the positions of the feature points of the face in the first two-dimensional image and the depth image corresponding to the first two-dimensional image; estimating the initial transformation matrix from the average face model to the three-dimensional point cloud model corresponding to the depth image according to the three-dimensional positions of the feature points of the face and the three-dimensional positions of the feature points of the average face model.

Optionally, the first two-dimensional image may be a color image, or may be one first two-dimensional image and one depth image. In the above-mentioned second three-dimensional face database, a three-dimensional face model wearing an arbitrary expression can be expressed as: $F=\bar{F}+A_{id}\alpha_{id}+A_{exp}\alpha_{exp}$, where, $\bar{F}$ is the average face model in the second three-dimensional face database, $A_{id}$ is the shape feature vector of Principal Components Analysis (PCA) in the second three-dimensional face database, $A_{exp}$ the expression feature vector of PCA in the second three-dimensional face database, $\alpha_{id}$ is a shape parameter, and $\alpha_{exp}$ is an expression parameter.

The feature point of the face in the above-mentioned color image is detected to obtain the two-dimensional position (u, v) of the feature point of the face in the color image. The three-dimensional position of the feature point of the face is obtained according to the corresponding relationship between the color image and the depth image, and the perspective projection model. The three-dimensional position of the feature point of the face is denoted as Q. The position of a database feature point corresponding to the detected feature point is searched in the second three-dimensional face database (the corner of the eye corresponds to the corner of the eye, and the nose tip corresponds to the nose tip), and denoted as P. The initial transformation matrix between P and Q can be obtained through an Iterative Closest Point (ICP) algorithm, namely, the initial attitude $T_0$ of the picture capturing device. Then, the attitude T, the shape parameter $\alpha_{id}$, and the expression parameter $\alpha_{exp}$ are iteratively estimated by using the second three-dimensional face database and the initial transformation matrix, until the fitting error is reduced to a given threshold δ. During iteration, the three-dimensional model of the face is fitted based on the average face model with at least one of the following conditions as a target: the distances between projection positions of the feature points of the three-dimensional model of the face obtained by fitting in the image coordinate system and positions of feature points of the two-dimensional image included in the first image are minimal, as small as possible, or convergent, which may be named as face feature fitting item; the distance between a corresponding point pair of the three-dimensional model of the face obtained by fitting and the three-dimensional point cloud obtained by mapping of the depth image is minimal, as small as possible, or convergent, which may be named as a depth information fitting item.

In detail, for the face feature fitting item, the error between projection position of the feature point of the three-dimensional model of the face obtained by fitting in the image coordinate system and position of feature point of the two-dimensional image included in the first image is minimal or convergent, so that the two positions are as close as possible. Assuming that the three-dimensional face model fitted in k-1 steps is $F_{k-1}$, and the attitude of the picture capturing device is $T_{k-1}$, after the three-dimensional coordinate of the feature point $P_{k-1}$ of the face of $F_{k-1}$ is obtained, for each point p of $P_{k-1}$ (for example, a point of the corner of eye), the point can be projected to the image coordinate system of the color image under the attitude $T_{k-1}$ to obtain the coordinate (u', v') of its projection. In the two-dimensional color image, taking the position (u, v) of the point corresponding to p (for example, the point of the corner of eye) in the image, $\|(u', v')-(u, v)\|^2$ should be as small as possible.

For the depth information fitting item, the distance between a corresponding point pair of the three-dimensional model of the face obtained by fitting and the three-dimensional point cloud obtained by mapping of the depth image is minimal, as small as possible, or convergent, so that the fitted three-dimensional face model $F_{k-1}$ is as close to the acquired face model in the depth image as possible. The depth image data is transformed into three-dimensional point cloud data and denoted as M. For any point p of $F_{k-1}$, according to an octree search algorithm (kd tree), the nearest point q can be searched in M. Taking (p, q) as the corresponding point pair, the target is to make the two points of the corresponding point pair closer to each other, namely, $\|p-q\|^2$ should be as small as possible.

Optionally, a conjugate gradient algorithm may be used in the iteration for solving. In order to speed up the solving process, the attitude of the picture capturing device, the shape parameter, and the expression parameter are independently solved in each iteration process. Namely, when the attitude of the picture capturing device is solved, it is ensured that the shape parameter and expression parameter are unchanged, so does the solving of the shape parameter and expression parameter.

The method further includes: acquiring outer contour points of the face; dividing the background region into a background region connected to the face and a far background region according to distances between the outer contour points and a center of the face; wherein a distance between the far background region and the center of the face is greater than a distance between the background region connected to the face and the center of the face. Optionally, the outer contour points of the face can be obtained by projecting the obtained three-dimensional face model to the image coordinate system. Optionally, the outer contour points of the face can be found through the contour feature points of the three-dimensional face model. The methods for the above-mentioned projection may include orthogonal projection or perspective projection. The region outside the contour points of the face belongs to the non-head region or the background region. The position of the above-mentioned center point of the face may be defined as a mean value of the coordinates of the face contour points $V^{mean}$=mean($V^{face\ contour}$). A boundary region of the background region connected to the face and the far background region may be $V^{mean}+(V^{face\ contour}-V^{mean})*(1+r_i)$, where, $V^{face\ contour}$ is the face contour point, $r_i$ is a coefficient, and the coefficient can be set according to the situations. Optionally, other parameters for measuring the size of the face may also be used for the determination, such as the length and width of the face. Actually, these parameters are the equivalent of the distance between the outer contour point and the center of the face.

Optionally, acquiring depth information corresponding to the background region, includes: acquiring depth information of the background region connected to the face and the far background region according to the depth image. Or, the method further includes: acquiring depth information of the nose on the face according to the three-dimensional model of the face. Acquiring the depth information corresponding to the background region includes: estimating a depth value of a point in the background region connected to the face and a depth value of the far background region according to a depth value of the nose on the face and a difference between depth information of the outer contour point and the depth value of the nose on the face. When the quality of the depth image is relatively good, the depth information of the background region can be directly obtained according to the depth image. When the quality of the depth image is not good, the depth value of the nose on the face can be obtained according to the depth image, or the depth value of the nose on the face and the depth value of the outer contour point of the face can be obtained according to the three-dimensional model of the face obtained by fitting, then the depth value of the point in the background region connected to the face and the depth value of the far background region are estimated according to the depth value obtained above. For example, the depth value of the background region connected to the face can be obtained according to the following algorithm $V_d^{nose}+(V_d^{face\ contour}-V_d^{nose})*(1+r_i)$, where, $V_d^{nose}$ is the depth value of the nose on the face, $V_d^{face\ contour}$ is the depth value of the outer contour point of the face, and $r_i$ is a coefficient. For the depth value of the far background region, the background region connected to the face and the far background region may be meshed, then the depth value of the mesh in the far background region can be the mean value of the depth values of the points on the mesh that are connected thereto and have the depth value, and this process is cycled and iterated until each of the mesh points of the background has a depth value.

Optionally, the background region includes a mesh. The method further includes: optimizing the depth value of the background region, wherein the optimizing includes: keeping a depth value of the outer contour point of the face unchanged and keeping the variations of depth values of adjacent mesh points consistent. Specifically, optimizing the depth of the points on the background mesh to keep the depth of the face contour point ($V^{face\ contour}$) unchanged and make the variation of depth value of other mesh points (denoted as $V^{other\ (i)}=\{V^{face\ contour\ expand\ (i)}\}+\{V^{image\ contour}\}$) and the variation of the depth value of adjacent point as close as possible, where $V^{face\ contour\ expand\ (i)}$ represents the points on the mesh of the background region connected to the face, and $V^{image\ contour}$ represents points on an edge of the color image. The above-mentioned consistency refers to being as close as possible or approximately consistent.

Optionally, when the background region includes the above-mentioned mesh, the three-dimensional model of the background region needs to be rotated under the world coordinate system, or rotated together with the three-dimensional model of the face, and then projected to the image coordinate system.

Optionally, fusing the face region with the processed background region, includes at least one of the following: an image boundary of the first image is consistent with a boundary of an image of the processed background region, so that the final two-dimensional image has the same size as the above-mentioned first image; the outer contour points of the face of the first image are consistent with the outer contour points of the face of the projection of the three-dimensional model of the face rotated by the first angle in the image coordinate system of the first image, so as to ensure a smooth transition between the background region and the face region. When the background region includes the above-mentioned mesh, the position of the mesh points of the background before the rotation should be as close to the position of the mesh points of the background after the rotation and projection as possible. Specifically, the above-mentioned fusion process may also be regarded as an optimization process. It should be noted that, in fact, due to the limits of various conditions, the above-mentioned consistency refers to being as close as possible or approximately consistent.

The background region of the first image includes a first mesh. The method further includes: acquiring a position of a second mesh corresponding to the first mesh of the background region of the first image, wherein the position of the second mesh is in a region of the projection of the three-dimensional model of the background region rotated by the first angle in the image coordinate system of the first image. The second mesh is filled according to textures and/or colors of the first mesh.

Specifically, the above-mentioned background region can be divided to form the first mesh. Meanwhile, a mesh can also be generated during reconstructing the three-dimensional model of the face. That is to say, as the overall first image is meshing, after the three-dimensional model of the face is rotated and projected, there also is a mesh one-to-one corresponding to the mesh of the first image. Further, a mesh corresponding to each pixel and a barycentric coordinate of the mesh can be recorded. The corresponding mesh is found in the two-dimensional image of projection. The second mesh is filled according to textures and/or colors of the first mesh by a three-dimensional rendering algorithm (such as scan-line z-buffer algorithm) to complete the rasterization.

Optionally, the first mesh is a triangular mesh. Specifically, a triangle meshing process of the above-mentioned background region may be as follows. N laps of contour points outward the outer contour points of the face are determined (denoted as $\{V^{face\ contour\ expand\ (i)}, i=1 \ldots N\}$), and these contour points arc used to establish the above-mentioned background region connected to the face. The above-mentioned process can be expressed as:

$$V^{mean}=\text{mean}(V^{face\ contour});$$

$$V^{face\ contour\ expand\ (i)}=V^{mean}+(V^{face\ contour}-V^{mean})*(1+r_i),$$

where different contour points can be established as $r_i$ takes different values.

Then, a lap of the contour points are added to the image boundary of the first image (denoted as $V^{face\ contour}$), so that the positions of all the mesh points of the background region in the image coordinate system are obtained. A Delaunay algorithm is used to triangulate all the contour points added ($V=\{V_i\}$), to form a mesh structure of the background region (an edge between the two points is recorded as $E=\{E_{ij}\}$), so that the mesh structure of the background region can be smoothly connected to a three-dimensional face network of the reconstructed three-dimensional face model.

With the method described in the embodiment of the present invention, the angle of the face in the captured image can be adjusted to achieve the effect of face embellishing.

Figure 2:
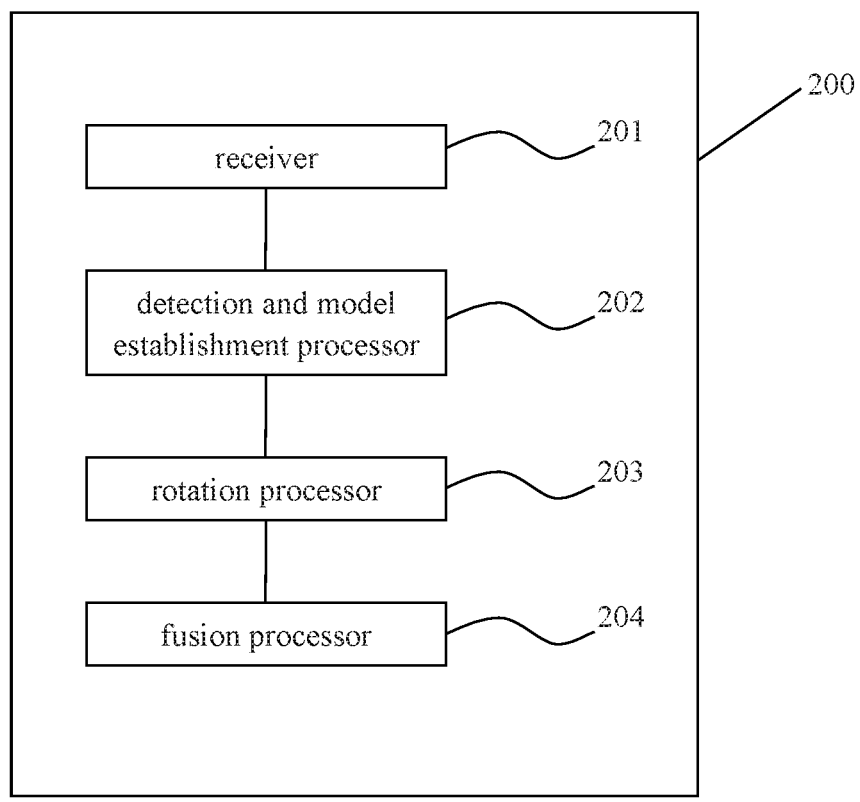
FIG. 2 is a schematic diagram of a device for image processing according to embodiment 2 of the present invention.

A device 200 for image processing according to embodiment 2 of the present invention will be described in detail below with reference to FIG. 2. As shown in FIG. 2, the device 200 includes: a receiver 201, a detection and model establishment processor 202, a rotation processor 203, and a fusion processor 204.

The receiver 201 is configured to receive a first image, and the first image includes a face.

Optionally, the first image includes a first two-dimensional image, and the first two-dimensional image may be a two-dimensional color image, such as an RGB (Red, Green, Blue) image, Optionally, receiving a first image may include acquiring the first image from a storage device. The storage device may be a ROM (Read-Only Memory), a RAM (Random Access Memory), or a flash.

The detection and model establishment processor 202 is configured to detect the face and a background region of the first image, and establish a three-dimensional model of the face according to the first image.

Optionally, the three-dimensional model may be a three-dimensional point cloud in a world coordinate system.

The rotation processor 203 is configured to rotate the three-dimensional model of the face by a first angle.

Optionally, the first angle may be preset.

The fusion processor 204 is configured to project the three-dimensional model of the face rotated by the first angle to an image coordinate system of the first image, and fuse the face region with a processed background region to obtain a second image.

The device further includes a background processor, configured to acquire depth information corresponding to the background region, acquire a three-dimensional model of the background region according to the depth information corresponding to the background region, rotate the three-dimensional model of the background region by the first angle, and project the three-dimensional model of the background region rotated by the first angle to the image coordinate system of the first image; by doing so, the processed background region of the first image is obtained. Optionally, the order for performing the step of rotating the three-dimensional model of the background region by the first angle and the step of rotating the three-dimensional model of the face by the first angle may be unlimited. The steps can be performed successively, namely, either the three-dimensional model of the face or the three-dimensional model of the background region may be rotated first. Or, the steps can be performed in parallel, namely, the three-dimensional model of the face and the three-dimensional model of the background region are rotated, simultaneously. Processing the background region may further include filling the background region projected to the image coordinate system of the first image according to textures and/or colors of the first image.

The background processor may further be configured to compare the two-dimensional image obtained by projecting the three-dimensional model of the face with the two-dimensional image obtained by projecting the three-dimensional model of the background region, without performing the step of projecting the rotated three-dimensional model of the background region, to obtain unsmooth transitional regions such as overlap and/or blank areas, and the like. The above-mentioned unsmooth transitional regions are processed by using the texture and/or color of the background, and the shape and texture of the two-dimensional image obtained by projecting the three-dimensional model of the face are unchanged during the processing. The order for performing the above-mentioned step of processing and the step of rotating the three-dimensional model of the face and projecting the three-dimensional model of the face is unlimited. The steps may be performed successively or in parallel.

The first image includes a first two-dimensional image. The detection and model establishment processor is specifically configured to detect feature points of the face in the first two-dimensional image; and fit the three-dimensional model of the face according to the feature points and a given fitting target by using a first three-dimensional face model database. Or, the first two-dimensional image is iteratively calculated based on a deep convolutional neural network to obtain three-dimensional reconstruction parameters, and the three-dimensional model of the face is established according to the three-dimensional reconstruction parameters. The fitting target is to make distances between projections of three-dimensional feature points of the three-dimensional model of the face obtained by fitting in the image coordinate system of the first image and the feature points of the face in the first two-dimensional image minimal; as small as possible, or convergent. Optionally, there may have 68 feature points of the face which includes face contour, mouth, nose, eyes, eyebrows, and the like. Optionally, the first three-dimensional face model database may be a Morphable Face Model database, and based on this, the lighting, texture, and shape detail may be further fitted therewith.

The first image includes a first two-dimensional image and a depth image corresponding to the first two-dimensional image, and the first two-dimensional image and the depth image include the face. The detection and model establishment processor is specifically configured to fit the three-dimensional model of the face according to a position of the feature point of the face in the first two-dimensional image and the depth image corresponding to the first two-dimensional image by using a second three-dimensional face database.

The second three-dimensional face database includes average face models and the following: shape feature vectors and expression feature vectors. The detection and model establishment processor is specifically configured to estimate an initial transformation matrix from the average face model to a three-dimensional point cloud model corresponding to the depth image, and according to the initial transformation matrix and the following: shape feature vectors and expression feature vectors, fit the three-dimensional model of the face based on the average face model with at least one of the following conditions as a target: the distances between projection positions of the feature points of the three-dimensional model of the face obtained by fitting in the image coordinate system and positions of feature points of the two-dimensional image included in the corresponding first image are minimal, convergent, or as small as possible; the distance between a corresponding point pair of the three-dimensional model of the face obtained by fitting and the three-dimensional point cloud obtained by mapping of the depth image is minimal, as small as possible, or convergent. Optionally, the second three-dimensional face database can be stored in the device beforehand, such as a mobile phone, a tablet, a PC, and the like.

The detection and model establishment processor is specifically configured to calculate three-dimensional positions of the feature points of the face according to the positions of the feature points of the face in the first two-dimensional image and the depth image corresponding to the first two-dimensional image; estimate the initial transformation matrix from the average face model to the three-dimensional point cloud model corresponding to the depth image based on the three-dimensional positions of the feature points of the face and the three-dimensional positions of feature points of the average face model.

Optionally, the first two-dimensional image may be a color image, there may have one first two-dimensional image and one depth image. In the above-mentioned second three-dimensional face database, a three-dimensional face model wearing an arbitrary expression can be expressed as: $F=\overline{F}+A_{id}\alpha_{id}+A_{exp}\alpha_{exp}$, where, $\overline{F}$ is the average face model in the second three-dimensional face database, $A_{id}$ is the shape feature vector of Principal Components Analysis (PCA) in the second three-dimensional face database, $A_{exp}$ is the expression feature vector of PCA in the second three-dimensional face database, $\alpha_{id}$ is a shape parameter, and $\alpha_{exp}$ is an expression parameter.

The feature point of the face in the above-mentioned color image is detected to obtain the two-dimensional position (u, v) of the feature point of the face in the color image. The three-dimensional position of the feature point of the face is obtained according to the corresponding relationship between the color image and the depth image, and the perspective projection model. The three-dimensional position of the feature point of the face is denoted as Q. The position of a database feature point corresponding to the detected feature point is searched in the second three-dimensional face database (the corner of eye corresponds to the corner of eye, and the nose tip corresponds to the nose tip), and denoted as P. The initial transformation matrix between P and Q can be obtained through an Iterative Closest Point (ICP) algorithm, namely, the initial attitude $T_0$ of the picture capturing device. Then, the attitude T, the shape parameter $\alpha_{id}$, and the expression parameter $\alpha_{exp}$ are iteratively estimated by using the second three-dimensional face database and the initial transformation matrix, until the fitting error is reduced to a given threshold δ. During iteration, the three-dimensional model of the face is fitted based on the average face model with at least one of the following conditions as a target: the distances between projection positions of the feature points of the three-dimensional model of the face obtained by fitting in the image coordinate system and positions of feature points of the two-dimensional image included in the first image are minimal, convergent, or as small as possible, which may be named as face feature fitting item; the distance between a corresponding point pair of the three-dimensional model of the face obtained by fitting and the three-dimensional point cloud obtained by mapping of the depth image is minimal, convergent, of as small as possible, which may be named as depth information fitting item.

In detail, for the face feature fitting item, the error between projection position of the feature point of the three-dimensional model of the face obtained by fitting in the image coordinate system and position of feature point of the two-dimensional image included in the first image is minimal or convergent, so that the two positions are as close as possible. Assuming that the three-dimensional face model fitted in k-1 steps is $F_{k-1}$, and the attitude of the picture capturing device is $T_{k-1}$, after the three-dimensional coordinate of the feature point $P_{k-1}$ of the face of $F_{k-1}$ is obtained, for each point p of $P_{k-1}$ (for example, a point of the corner of eye), the point can be projected to the image coordinate system of the color image under the attitude $T_{k-1}$ to obtain the coordinate (u', v') of its projection. In the two-dimensional color image, taking the position (u, v) of the point corresponding to p (for example, the point of the corner of eye) in the image, $\|(u', v')-(u, v)\|^2$ should be as small as possible.

For the depth information fitting item, the distance between a corresponding point pair of the three-dimensional model of the face obtained by fitting and the three-dimensional point cloud obtained by mapping of the depth image is minimal, as small as possible, or convergent, so that the fitted three-dimensional face model $F_{k-1}$ is as close to the acquired face model in the depth image as possible. The depth image data is transformed into three-dimensional point cloud data and denoted as M. For any point p of $F_{k-1}$, according to an octree search algorithm (kd tree), the nearest point q can be searched in M. Taking (p, q) as the corresponding point pair, the target is to make the two points of the corresponding point pair closer to each other, namely, $\|p-q\|^2$ should be as small as possible.

Optionally, a conjugate gradient algorithm may be used in the iteration for solving. In order to speed up the solving process, the attitude of the picture capturing device, the shape parameter, and the expression parameter are independently solved in each iteration process. Namely, when the attitude of the picture capturing device is solved, it is ensured that the shape parameter and expression parameter are unchanged, so does the solving of the shape parameter and expression parameter.

The device further includes an acquisition and background division processor which is configured to acquire outer contour points of the face; divide the background region into a background region connected to the face and a far background region according to distances between the outer contour points and a center of the face; wherein a distance between the far background region and the center of the face is greater than a distance between the background region connected to the face and the center of the face. Optionally, the outer contour points of the face can be obtained by projecting the obtained three-dimensional face model to the image coordinate system. Optionally, the outer contour points of the face can be found through the contour feature points of the three-dimensional face model. The methods for the above-mentioned projection may include orthogonal projection or perspective projection. The region outside the contour points of the face belongs to the non-head region or the background region. The position of the above-mentioned center point of the face may be defined as a mean value of the coordinates of the face contour points $V^{mean}=\text{mean}(V^{face\ contour})$. A boundary region of the background region connected to the face and the far background region may be $V^{mean}+(V^{face\ contour}-V^{mean})*(1+r_i)$, where, $V^{face\ contour}$ is the face contour point, $r_i$ is a coefficient, and the coefficient can be set according to the situations. Optionally, other parameters for measuring the size of the face may also be used for the determination, such as the length and width of the face. Actually, these parameters are the equivalent of the distance between the outer contour point and the center of the face.

The background processor is configured to acquire depth information of the background region connected to the face and the far background region according to the depth image; or the device further includes a nose depth information acquisition processor configured to acquire depth information of the nose on the face according to the three-dimensional model of the face. The background processor is configured to estimate a depth value of a point in the background region connected to the face and a depth value of the far background region according to a depth value of the nose on the face and a difference between depth information of the outer contour point and the depth value of the nose on the face. When the quality of the depth image is relatively good, the depth information of the background region can be directly obtained according to the depth image. When the quality of the depth image is not good, the depth value of the nose on the face can be obtained according to the depth image, or the depth value of the nose on the face and the depth value of the outer contour point of the face can be obtained according to the three-dimensional model of the face obtained by fitting, then the depth value of the point in the background region connected to the face and the depth value of the far background region are estimated according to the depth value obtained above. For example, the depth value of the background region connected to the face can be obtained according to the following algorithm $V_d^{nose}+(V_d^{face\ contour}-V_d^{nose})*(1+r_i)$, where, $V_d^{nose}$ is the depth value of the nose on the face, $V_d^{face\ contour}$ is the depth value of the outer contour point of the face, and $r_i$ is a coefficient. For the depth value of the far background region, the background region connected to the face and the far background region may be meshed, then the depth value of the mesh in the far background region can be the mean value of the depth values of the points on the mesh that are connected thereto and have the depth value, and this process is cycled and iterated until each of the mesh points of the background has a depth value.

The background region includes a mesh. The device further includes a optimization processor configured to keep a depth value of the outer contour point of the face unchanged and keep variations of depth values of adjacent mesh points consistent. Specifically, the target of optimizing the depth of the points on the background mesh is to keep the depth of the face contour point ($V^{face\ contour}$) unchanged and make the variation of depth value of other mesh points (denoted as $V^{other\ (i)}=\{V^{face\ contour\ expand\ (i)}\}+\{V^{image\ contour}\}$) and the variation of the depth value of adjacent point as close as possible, where $V^{face\ contour\ expand\ (i)}$ represents the points on the mesh of the background region connected to the face, and $V^{image\ contour}$ represents points on an edge of the color image. The above-mentioned consistency refers to being as close as possible or approximately consistent.

Optionally, when the background region includes the above-mentioned mesh, the three-dimensional model of the background region needs to be rotated under the world coordinate system, or be rotated together with the three-dimensional model of the face, and then projected to the image coordinate system.

Optionally, the fusion processor is specifically configured to realize the following aspects. An image boundary of the first image is consistent with a boundary of an image of the processed background region, so that the final two-dimensional image has the same size as the above-mentioned first image. The outer contour points of the face of the first image are consistent with the outer contour points of the face of the projection of the three-dimensional model of the face rotated by the first angle in the image coordinate system of the first image, so as to ensure a smooth transition between the background region and the face region. When the background region includes the above-mentioned mesh, the position of the mesh points of the background before the rotation should be as close to the position of the mesh points of the background after the rotation and projection as possible. Specifically, the above-mentioned fusion process may also be regarded as an optimization process. It should be noted that, in fact, due to the limits of various conditions, the above-mentioned consistency refers to being as close as possible or approximately consistent.

The background region of the first image includes a first mesh. The device further includes a filling processor configured to acquire a position of a second mesh corresponding to the first mesh of the background region of the first image, wherein the position of the second mesh is in a region of the projection of the three-dimensional model of the background region rotated by the first angle in the image coordinate system of the first image, and fill the second mesh according to textures and/or colors of the first mesh. Specifically, the above-mentioned background region can be divided to form the first mesh. Meanwhile, a mesh can also be generated during reconstructing the three-dimensional model of the face. That is to say, as the overall first image is meshing, after the three-dimensional model of the face is rotated and projected, there also have a mesh one-to-one corresponding to the mesh of the first image. Further, a mesh corresponding to each pixel and a barycentric coordinate of the mesh can be recorded. The corresponding mesh is found in the two-dimensional image of projection. The second mesh is filled according to textures and/or colors of the first mesh by a three-dimensional rendering algorithm such as scan-line z-buffer algorithm) to complete the rasterization.

Optionally, the first mesh is a triangular mesh. Specifically, a triangle meshing process of the above-mentioned background region may be as follows. N laps of contour points outward the outer contour points of the face are determined (denoted as $\{V^{face\ contour\ expand\ (i)}, i=1\ldots N\}$), and these contour points are used to establish the above-mentioned background region connected to the face. The above-mentioned process can be expressed as:

$$V^{mean}=\text{mean}(V_d^{face\ contour});$$

$$V^{face\ contour\ expand\ (i)}=V^{mean}+(V^{face\ contour}-V^{mean})*(1+r_i),$$

where, different contour points can be established as r takes different values.

Then, a lap of the contour points is added to the image boundary of the first image (denoted as $V^{image\ contour}$), so that the positions of all the mesh points of the background region in the image coordinate system are obtained. A Delaunay algorithm is used to triangulate all the contour points added ($V=\{V_i\}$) to form a mesh structure of the background region (an edge between the two points is recorded as $E=\{E_{ij}\}$), so that the mesh structure of the background region can be smoothly connected to a three-dimensional face network of the reconstructed three-dimensional face model.

Figure 7:
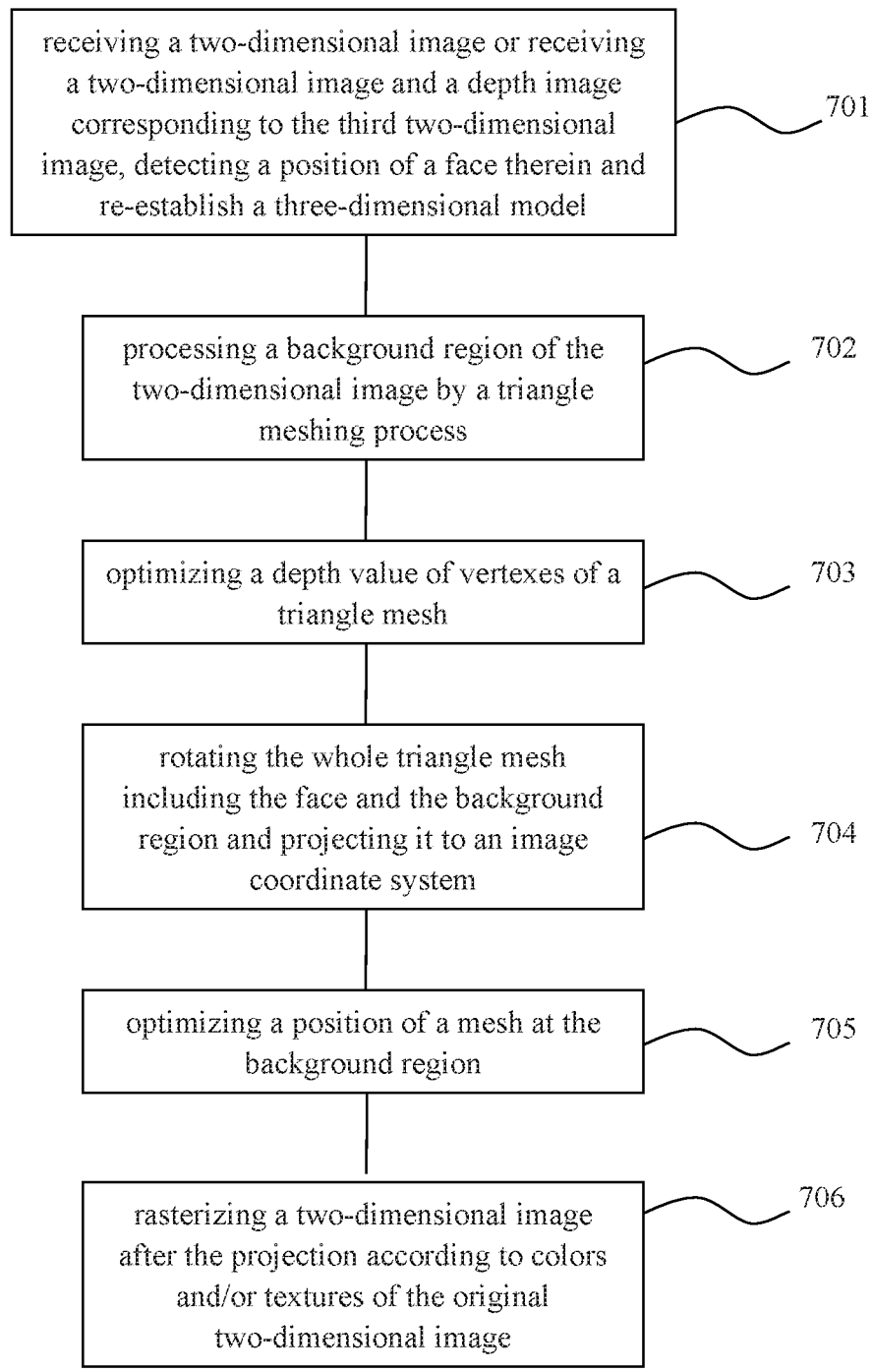
FIG. 7 is another flowchart showing a method for image processing according to embodiment 1 of the present invention.

FIG. 7 provides preferred implementation processes suitable for the embodiments of the present invention, and the above description may be taken for reference to understand the specific contents.

With the device described in the embodiment of the present invention, the angle of the face in the captured image can be adjusted to achieve the effect of face embellishing.

Figure 3:
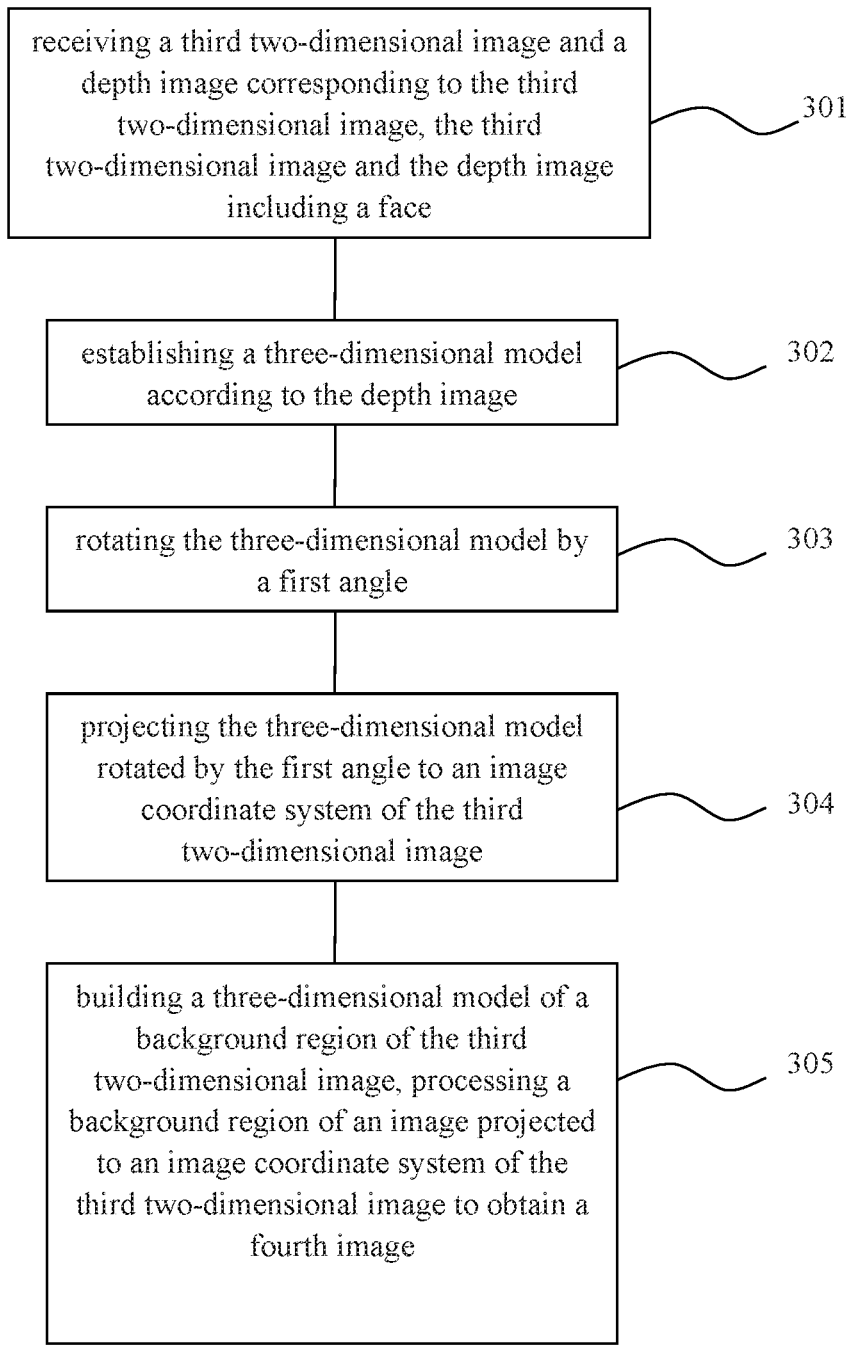
FIG. 3 is a flowchart showing a method for image processing according to embodiment 3 of the present invention.

A method for image processing according to embodiment 3 of the present invention is described in detail below with reference to FIG. 3. As shown in FIG. 3, the method includes the following steps.

Step 301: receiving a third two-dimensional image and a depth image corresponding to the third two-dimensional image, wherein the third two-dimensional image and the depth image include a face.

Optionally, the third two-dimensional image can be a color image, such as an RGB image. Optionally, the above-mentioned step of receiving a third two-dimensional image may include acquiring the third two-dimensional image from a storage device. The storage device may be a ROM (Read-Only Memory), a RAM (Random Access Memory), or a flash.

Step 302: establishing a three-dimensional model according to the depth image.

Optionally, the three-dimensional model may be a three-dimensional point cloud under a world coordinate system.

Step 303: rotating the three-dimensional model by a first angle.

Optionally, the first angle may be preset.

Step 304: projecting the three-dimensional model rotated by the first angle to an image coordinate system of the third two-dimensional image.

The methods of the projection may be an orthogonal projection or a perspective projection.

Step 305: processing the image projected to the image coordinate system of the third two-dimensional image according to the background region of the third two-dimensional image to obtain a fourth image.

Optionally, processing the image projected to the image coordinate system of the third two-dimensional image according to a background region of the third two-dimensional image, includes: processing the image projected to the image coordinate system of the third two-dimensional image according to at least one of the following aspects of the background of the third two-dimensional image, to make an edge and size of the fourth image consistent with an edge and size of the third two-dimensional image, wherein the aspects include color, texture, and background edge point position of the background region in the third two-dimensional image. Specifically, the two-dimensional image formed after the projection changes in edge and size with respect to the above-mentioned third two-dimensional image. The operation here is to repair the two-dimensional image formed after the projection to make it look more natural. Since the deviation portion with respect to the third two-dimensional image is located at an edge portion of the image, the first edge point of the third two-dimensional image and a second edge point of the image projected to the image coordinate system of the third two-dimensional image can be determined according to the size of the third two-dimensional image. The deviation portion between third two-dimensional image and the image projected to the image coordinate system of the third two-dimensional image is meshed according to the first edge point and the second edge point. A corresponding mesh in the image projected to the image coordinate system of the third two-dimensional image is repaired according to at least one of the following aspects of the mesh of the third two-dimensional image. The aspects include the color and texture of the background region of the third two-dimensional image.

For a specific implementation of the meshing, please refer to the related description in embodiment 1 or 2.

Figure 4:
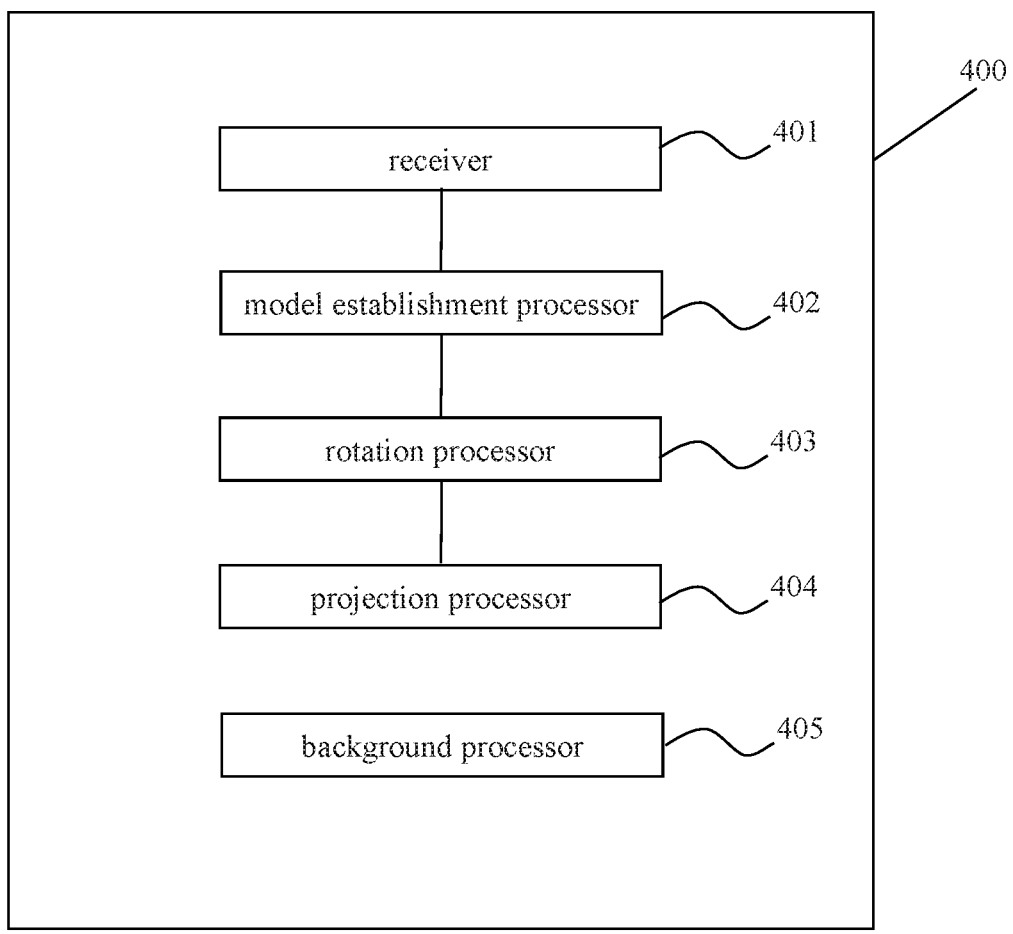
FIG. 4 is a schematic diagram of a device for image processing according to embodiment 4 of the present invention.

A device 400 for image processing according to embodiment 4 of the present invention will be described in detail below with reference to FIG. 4. As shown in FIG. 4, the device 400 includes the following parts.

A receiver 401 is configured to receive a third two-dimensional image and a depth image corresponding to the third two-dimensional image. The third two-dimensional image and the depth image include a face.

Optionally, the third two-dimensional image may be a color image, such as an RGB image. Optionally, the above-mentioned step of receiving a third two-dimensional image may include acquiring the third two-dimensional image from a storage device. The storage device may be a ROM (Read-Only Memory), a RAM (Random Access Memory), or a flash.

A model establishment processor 402 is configured to establish a three-dimensional model according to the depth image.

Optionally, the three-dimensional model may be a three-dimensional point cloud under a world coordinate system.

A rotation processor 403 is configured to rotate the three-dimensional model by a first angle.

Optionally, the first angle may be preset.

A projection processor 404 is configured to project the three-dimensional model rotated by the first angle to the image coordinate system of the third two-dimensional image.

The methods for projection may be an orthogonal projection or a perspective projection.

A background processor 405 is configured to process the image projected to the image coordinate system of the third two-dimensional image according to the background region of the third two-dimensional image to obtain a fourth image.

The background processor 405 is specifically configured to process the image projected to the image coordinate system of the third two-dimensional image according to at least one of the following aspects of the background of the third two-dimensional image, to make an edge and size of the fourth image consistent with an edge and size of the third two-dimensional image. The aspects include color, texture, and background edge point position of the background region in the third two-dimensional image.

The background processor 405 is specifically configured to determine a first edge point of the third two-dimensional image according to the size of the third two-dimensional image, determine a second edge point of the image projected to the image coordinate system of the third two-dimensional image, mesh a deviation portion between the third two-dimensional image and the image projected to the image coordinate system of the third two-dimensional image according to the first edge point and the second edge point, and repair a corresponding mesh in the image projected to the image coordinate system of the third two-dimensional image according to at least one of the following aspects of the mesh of the third two-dimensional image. The aspects include the color and texture of the background region of the third two-dimensional image.

For a specific implementation of the meshing, please refer to the related description in embodiment 1 or 2.

With the device described in the embodiment of the present invention, the angle of the face in the captured image can be adjusted to achieve the effect of face embellishing.

Figure 5:
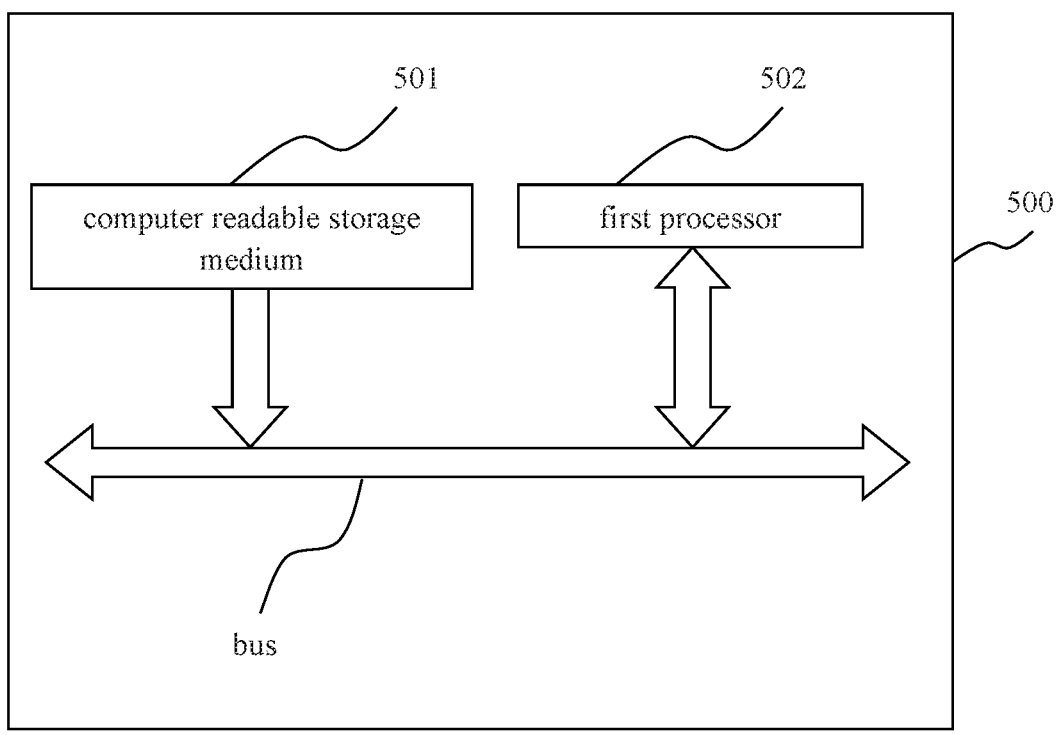
FIG. 5 is a schematic diagram of a device for image processing according to embodiment 5 of the present invention.

A device 500 for image processing according to embodiment 5 of the present invention is specifically described below with reference to FIG. 5. The device includes a computer readable storage medium 501. The computer readable storage medium 501 stores computer programs. When the computer programs are executed by a first processor 502, the steps of the method described in embodiment 1 or 3 are implemented. As shown in FIG. 5, optionally, the device 500 may include a bus.

With the device described in the embodiment of the present invention, the angle of the face in the captured image can be adjusted to achieve the effect of face embellishing.

Figure 6:
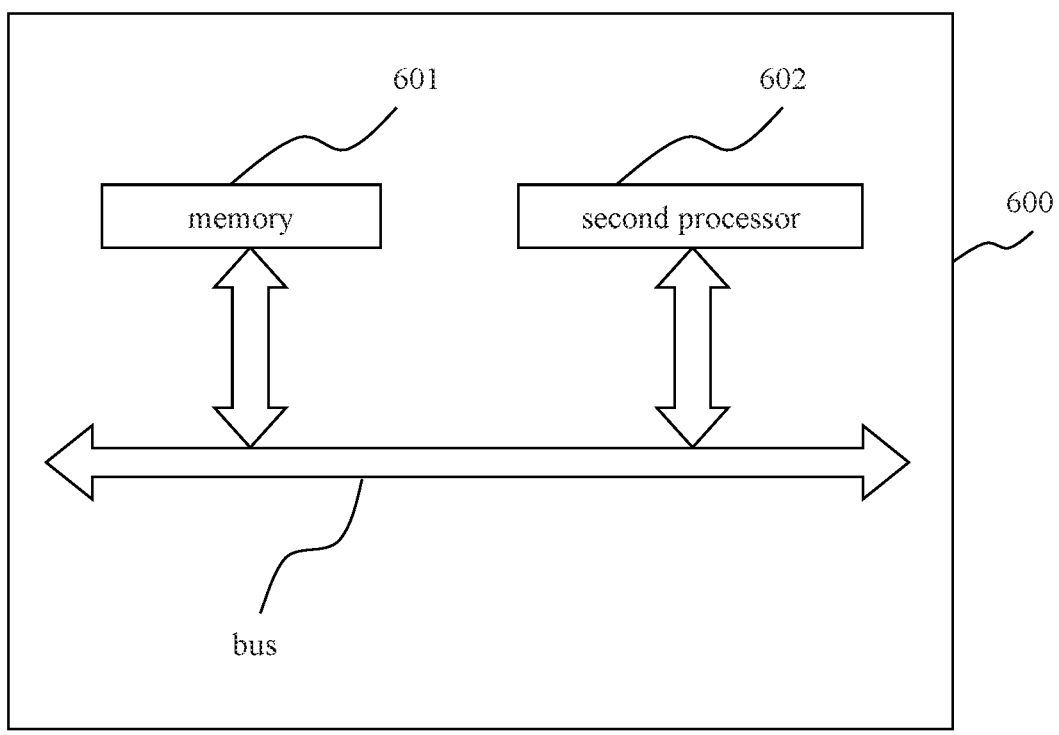
FIG. 6 is a schematic diagram of a device for image processing according to embodiment 6 of the present invention.

A device 600 for image processing according to embodiment 6 of the present invention is specifically described below with reference to FIG. 6. The device includes a memory 601, a second processor 602, and computer programs stored in the memory 601 and operable on the second processor 602. When the computer programs are executed by the second processor 602, the steps of the method described in embodiment 1 or 3 are implemented. Optionally, as shown in the figure, the device 600 further includes a bus.

With the device described in the embodiment of the present invention, the angle of the face in the captured image can be adjusted to achieve the effect of face embellishing.

Exemplarily, the computer programs may be divided into one or more modules/units that are stored in the memory and executed by the processor to perform the present invention. The one or more modules/units may be a series of computer program instruction segments capable of performing specific functions, and the instruction segments are used to describe the execution process of the computer programs in the device/terminal device.

The device/terminal device may be a computing device such as a mobile phone, a tablet computer, a desktop computer, a laptop, a palmtop computer, a cloud server and the like. The device/terminal device may include, but not limited to, a processor and a memory. It will be understood by those skilled in the art that the schematic diagram of the present invention is merely an example of the device/terminal device which do limit the device/terminal device. The device/terminal device may include more or less components, a combination of certain components, or different components than those shown in the drawings. For example, the device/terminal device may further include an input/output device, a network access device, a bus, and the like.

The above-mentioned processor may be central processing unit (CPU), or other general purpose processors, digital signal processor (DSP), application specific integrated circuit (ASIC), field-programmable gate array (FPGA), or other programmable logic devices, discrete or transistor logic device, discrete hardware components, and the like. The general-purpose processor may be a microprocessor or any conventional processor etc. The processor is a control center of the device/terminal device, which connects various parts of the entire device/terminal device by various interfaces and circuits.

The memory may be used to store the computer programs and/or modules. The processor realizes various functions of the device/terminal device by running or executing the computer programs and/or modules stored in the memory and invoking data stored in the memory. The memory may include a storage program area and a storage data area. In detail, the storage program area may store an operating system, an application required for at least one function (such as an image playing function, etc.), and the like. The storage data area may store data (such as video data, images, etc. created during the use of the mobile phone. In addition, the memory may include a high-speed random-access memory. Also, the memory may include a non-volatile memory, such as hard disk, memory, plug-in hard disk, smart media card (SMC), secure digital (SD) card, flash card, and at least one disk storage device, flash memory device, or other volatile solid state memory devices.

The module/unit integrated by the device/terminal device can be stored in a computer readable storage medium if it is implemented in the form of software functional unit and sold or used as a stand-alone product. Based on such understanding, implementation of all or part of the processes of the methods according to the above-mentioned embodiments of the present invention can also be realized by computer programs which instruct related hardware. The computer program may be stored in a computer readable storage medium. When the computer programs are executed by the processor, the steps of the various methods according to the above-mentioned embodiments can be implemented. In detail, the computer programs include computer program code, which may be source code, object code, executable file, or in some intermediate forms etc. The computer readable storage medium may include: any solid or device capable of carrying the computer program code, recording medium, USB flash disk, removable hard disk, magnetic disk, optical disk, computer memory, read-only memory (ROM), random access memory (RAM), electrical carrier signal, telecommunication signal, and software distribution medium. etc.

The imaging of the target object in the above-mentioned embodiments may be local or integral imaging. Both of the local and integral imaging are suitable for the method or device provided by the present invention. Or, if some modifications of the local and integral imaging are suitable for the method or device provided by the present invention, and these modifications can be derived by those of ordinary skill in the art without creative efforts, such modifications should be considered as falling within the scope of the present invention.

What is claimed is:

1. A method for image processing, comprising:
receiving a first set of images, wherein the first set of images includes a face;
detecting the face and a background region in the first set of images, establishing a three-dimensional model of the face according to the first set of images;
rotating the three-dimensional model of the face by a first angle; and
projecting the three-dimensional model of the face rotated by the first angle to an image coordinate system of the first set of images and fusing a face region with a processed background region to obtain a second image, wherein processing the background region comprises:
acquiring depth information corresponding to the background region, and acquiring a three-dimensional model of the background region according to the depth information corresponding to the background region;
rotating the three-dimensional model of the background region by the first angle; and
projecting the three-dimensional model of the background region rotated by the first angle to the image coordinate system of the first set of images to obtain the processed background region of the first set of images.

2. The method of claim 1, wherein
the first set of images comprises a first two-dimensional image and a depth image corresponding to the first two-dimensional image, and the first two-dimensional image and the depth image include the face; and
establishing the three-dimensional model of the face according to the first set of images comprises:
fitting the three-dimensional model of the face according to positions of feature points of the face in the first two-dimensional image and the depth image corresponding to the first two-dimensional image by using a second three-dimensional face database.

3. The method of claim 2, wherein
the second three-dimensional face database comprises average face models, shape feature vectors and expression feature vectors; and
fitting the three-dimensional model of the face, according to the positions of the feature points of the face in the first two-dimensional image and the depth image corresponding to the first two-dimensional image by using the second three-dimensional face database, comprises:
estimating an initial transformation matrix from the average face models to a three-dimensional point cloud model corresponding to the depth image, according to the initial transformation matrix, the shape feature vectors and the expression feature vectors, fitting the three-dimensional model of the face based on the average face models with at least one of the following conditions as a target:
distances between projection positions of the feature points of the three-dimensional model of the face obtained by fitting in the image coordinate system and positions of feature points of the two-dimensional image included in the first set of images are minimal or convergent; and
a distance between a corresponding point pair of the three-dimensional model of the face obtained by fitting and the three-dimensional point cloud obtained by mapping of the depth image is minimal or convergent.

4. The method of claim 1, wherein the method further comprises:
acquiring outer contour points of the face; and
dividing the background region into a background region connected to the face and a far background region according to distances between the outer contour points and a center of the face;
wherein a distance between the far background region and the center of the face is greater than a distance between the background region connected to the face and the center of the face.

5. The method of claim 4, wherein acquiring the depth information corresponding to the background region, comprises:
acquiring the depth information of the background region connected to the face and the far background region according to the depth image; or,
the method further comprises: acquiring depth information of the nose on the face according to the three-dimensional model of the face;
wherein acquiring the depth information corresponding to the background region comprises:
estimating a depth value of a point in the background region connected to the face and a depth value of the far background region according to a depth value of the nose on the face and a difference between depth information of the outer contour points and the depth value of the nose on the face.

6. The method of claim 4, wherein,
the background region comprises a mesh; and
the method further comprises:
optimizing a depth value of the background region;
wherein, the optimization comprises: keeping depth values of the outer contour points of the face unchanged and keeping variations of depth values of adjacent mesh points consistent.

7. The method of claim 1, wherein,
fusing the face region with the processed background region comprises at least one of the following conditions:
an image boundary of the first set of images is consistent with an image boundary of the processed background region; and
outer contour points of the face of the first set of images are consistent with outer contour points of a face of a projection of the three-dimensional model of the face in the image coordinate system of the first set of images after the three-dimensional model of the face is rotated by the first angle.

8. The method of claim 1, wherein,
the background region of the first set of images comprises a first mesh; and
the method further comprises:
acquiring a position of a second mesh corresponding to the first mesh of the background region of the first set of images, wherein the position of the second mesh is in a region of a projection of the three-dimensional model of the background region rotated by the first angle in the image coordinate system of the first set of images; and
the second mesh is filled according to textures and/or colors of the first mesh.

9. A device for image processing, comprising:
a receiver, configured to receive a first set of images, wherein the first set of images comprises a face;
a detection and model establishment processor configured to detect a face and a background region of the first set of images and establish a three-dimensional model of the face according to the first set of images;
a rotation processor configured to rotate the three-dimensional model of the face by a first angle; and
a fusion processor, configured to project the three-dimensional model of the face rotated by the first angle to an image coordinate system of the first set of images, and fuse a face region with a processed background region to obtain a second image,
wherein the device further comprises a background processor,
wherein the background processor is configured to acquire depth information corresponding to the background region, acquire a three-dimensional model of the background region according to the depth information corresponding to the background region, rotate the three-dimensional model of the background region by the first angle, and project the three-dimensional model of the background region rotated by the first angle to the image coordinate system of the first set of images, so that the processed background region of the first set of images is obtained.

10. The device of claim 9, wherein
the first set of images comprises a first two-dimensional image and a depth image corresponding to the first two-dimensional image, wherein the first two-dimensional image and the depth image comprise the face; and
the detection and model establishment processor is configured to fit the three-dimensional model of the face according to positions of feature points of the face in the first two-dimensional image and the depth image corresponding to the first two-dimensional image by using a second three-dimensional face database.

11. The device of claim 10, wherein
the second three-dimensional face database comprises average face models, shape feature vectors and expression feature vectors; and
the detection and model establishment processor is configured to estimate an initial transformation matrix from the average face models to a three-dimensional point cloud model corresponding to the depth image, and fit the three-dimensional model of the face based on the average face models according to the initial transformation matrix, the shape feature vectors and the expression feature vectors with at least one of the following conditions as a target:
distances between projection positions of the feature points of the three-dimensional model of the face obtained by fitting in the image coordinate system and positions of feature points of the two-dimensional image included in the first set of images are minimal; and distance between a corresponding point pair of the three-dimensional model of the face obtained by fitting and the three-dimensional point cloud obtained by mapping of the depth image is minimal.

12. The device of claim 9, wherein the device further comprises an acquisition and background division processor,
wherein, the acquisition and background division processor is configured to acquire outer contour points of the face, and divide the background region into a background region connected to the face and a far background region according to distances between the outer contour points and a center of the face; and wherein, a distance between the far background region and the center of the face is greater than a distance between the background region connected to the face and the center of the face.

13. The device of claim 12, wherein
the background processor is configured to acquire depth information of the background region connected to the face and the far background region according to the depth image; or
the device further comprises a nose depth information acquisition processor;
wherein, the nose depth information acquisition processor is configured to acquire depth information of a nose on the face according to the three-dimensional model of the face; and
the background processor is configured to estimate a depth value of a point in the background region connected to the face and a depth value of the far background region according to a depth value of the nose on the face and a difference between depth information of the outer contour points and the depth value of the nose on the face.

14. The device of claim 12, wherein
the background region comprises a mesh; and
the device further comprises an optimization processor, wherein the optimization processor is configured to keep depth values of the outer contour points of the face unchanged and keep variations of depth values of adjacent mesh points consistent.

15. The device of claim 9, wherein
the fusion processor is configured to make an image boundary of the first set of images consistent with a boundary of an image of the processed background region, and make outer contour points of the face of the first set of images consistent with outer contour points of a face of a projection of the three-dimensional model of the face in the image coordinate system of the first set of images after the three-dimensional model of the face is rotated by the first angle.

16. The device of claim 9, wherein
the background region of the first set of images comprises a first mesh; and
the device further comprises a filling processor;
wherein the filling processor is configured to acquire a position of a second mesh corresponding to the first mesh of the background region of the first set of images, wherein the position of the second mesh is in a region of a projection of the three-dimensional model of the background region rotated by the first angle in the image coordinate system of the first set of images; and
the second mesh is filled according to textures and/or colors of the first mesh.

17. A computer readable storage medium storing computer programs, wherein steps of the method of claim 1 are implemented when the computer programs are executed by a first processor.

18. A device for image processing, comprising a memory, a second processor, and computer programs stored in the memory and operable on the second processor, wherein steps of the method of claim 1 are implemented when the computer programs are executed by the second processor.

* * * * *